United States Patent [19]

Tachiwana

[11] Patent Number: 4,996,173

[45] Date of Patent: Feb. 26, 1991

[54] OPTICAL GLASS

[75] Inventor: Kazuo Tachiwana, Akishima, Japan

[73] Assignee: Hoya Corporation, Tokyo, Japan

[21] Appl. No.: 309,360

[22] Filed: Feb. 13, 1989

[30] Foreign Application Priority Data

Feb. 29, 1988 [JP] Japan .................................. 63-47117

[51] Int. Cl.$^5$ .......................... C03C 3/062; C03C 4/00
[52] U.S. Cl. ......................................... 501/73; 501/74;
501/75; 501/76; 501/77; 501/79; 501/903
[58] Field of Search ..................... 501/73, 77, 903, 74,
501/75, 76, 79

[56]   References Cited

U.S. PATENT DOCUMENTS

| | | | |
|---|---|---|---|
| 3,870,531 | 3/1975 | Jahn | 501/73 |
| 3,922,155 | 11/1975 | Broemer et al. | 501/73 |
| 4,390,638 | 2/1983 | Mennemann et al. | 501/903 |
| 4,508,834 | 4/1985 | Gliemeroth | 501/903 |
| 4,839,314 | 6/1989 | Boudot et al. | 501/903 |

Primary Examiner—Mark L. Bell
Attorney, Agent, or Firm—Nixon & Vanderhye

[57]   ABSTRACT

The optical glass of the present invention comprising $SiO_2$, alkali metal oxides, $P_2O_5$ and $Nb_2O_5$ has optical properties of 1.70 or more in refractive index nd and 30 or less in Abbe's number νd and is superior in devitrification resistance and stability.

3 Claims, No Drawings 016,173

OPTICAL GLASS

BACKGROUND OF THE INVENTION

1. Field of the Invention

The present invention relates to an optical glass and more particularly to an optical glass of high refractive index and high dispersion having a refractive index nd of 1.70 or more and an Abbe's number νd of 30 or less.

2. Description of Prior Art

As such an optical glass, there are disclosed, for example, a glass comprising, as main components, $P_2O_5$, $Na_2O$, $TiO_2$ and $WO_3$, in Japanese Patent Application Kokai (Laid-Open) No. 17409/1974, a glass consisting of a $P_2O_5$-$R_2O$ (R is a mono-valent metal)-ZnO-$Nb_2O_5$ type glass, in Japanese Pat. Publication No. 40094/1981, and a glass in which $BPO_4$ and/or $Al(PO_3)_3$ is incorporated into a $SiO_2$-$TiO_2$-$Nb_2O_5$-$R_2O$ (R is a mono-valent metal) type glass, in Japanese Pat. Publication No. 54247/1985.

However, the glasses disclosed in Japanese Pat. Application Kokai (Laid-Open) No. 17409/1974 and Japanese Pat. Publication No. 40094/1981 have low devitrification resistance. The glass disclosed in Japanese Pat. Publication No. 54247/1985, when the refractive index nd is increased to 1.70 or more, has a high devitrification tendency in the vicinity of the softening temperature and accordingly is devitrified when the glass block is heated and softened, making the press molding difficult.

Hence, an object of the present invention is to provide a high refractive index and high dispersion optical glass which has a refractive index nd of 1.70 or more and an Abbe's number νd of 30 or less and which is highly resistant to devitrification and stable.

Other objects of the present invention are apparent from the following descriptions.

SUMMARY OF THE INVENTION

The present invention made study in order to achieve the above object. As a result, it was found that the optical glass of the below given composition comprising $SiO_2$, alkali metal oxides, $P_2O_5$ and $Nb_2O_5$ has optical properties of 1.70 or more in refractive index nd and 30 or less in Abbe's number νd and is superior in devitrification resistance and stability. This finding has led to the completion of the present invention.

The present invention resides in an optical glass of high refractive index and high dispersion comprising

| | |
|---|---|
| $SiO_2$ | 5–30% by weight |
| $GeO_2$ | 0–25% by weight |
| the sum of $SiO_2$ and $GeO_2$ | 5–30% by weight |
| $Na_2O$ | 0–19% by weight |
| $K_2O$ | 0–19% by weight |
| the sum of $Na_2O$ and $K_2O$ | 10–19% by weight |
| $P_2O_5$ | 10–35% by weight |
| $Nb_2O_5$ | 18–49% by weight |
| $TiO_2$ | 0–14% by weight |
| $Ta_2O_5$ | 0–20% by weight |
| $ZrO_2$ | 0–10% by weight |
| $WO_3$ | 0–5% by weight |
| PbO | 0–20% by weight |
| ZnO | 0–10% by weight |
| $Bi_2O_3$ | 0–20% by weight |
| the sum of $Nb_2O_5$, $Ta_2O_5$, $ZrO_2$, $WO_3$, PbO, ZnO and $Bi_2O_3$ | 18–49% by weight |
| $B_2O_3$ | 0–15% by weight |
| $Al_2O_3$ | 0–5% by weight |
| and further comprising | |
| $As_2O_3$ | 0–3% by weight based on the total amount of the above components. |

DETAILED DESCRIPTION OF THE INVENTION

The role and amount of each component constituting the optical glass of the present invention are described below.

In the optical glass of the present invention, $SiO_2$ is a component which is effective for increasing the viscosity of the resulting glass and reducing the devitrification tendency and is suitable for increasing the chemical durability and reducing the expansion coefficient. When the $SiO_2$ amount is less than 5% by weight, the above effects are not obtained. When the amount is more than 30% by weight, the resulting glass has no optical properties as desired. Therefore, the $SiO_2$ amount is limited to a range of 5–30% by weight, preferably 5–26% by weight. $GeO_2$ is a component which is effective for increasing the refractive index of the resulting glass. When the $GeO_2$ amount is more than 25% by weight, the resulting glass is highly colored and has a high devitrification tendency at low temperatures. Therefore, the $GeO_2$ amount is limited to a range of 0–25% by weight, preferably 0–18% by weight. When the total amount of $SiO_2$ and $GeO_2$ is more than 30% by weight, the resulting glass has no optical properties as desired. Therefore, the total amount of $SiO_2$ and $GeO_2$ is limited to a range of 5–30% by weight, preferably 5–26% by weight.

$Na_2O$ and $K_2O$ are each a component which is important for improving the meltability of the resulting glass and controlling the devitrification tendency. When the respective amounts of $Na_2O$ and $K_2O$ are more than 19% by weight, the resulting glass has no optical properties as desired. Accordingly, the $Na_2O$ amount is limited to a range of 0–19% by weight, preferably 5–19% by weight, and the $K_2O$ amount is limited to a range of 0–19% by weight, preferably 5–18% by weight. When the total amount of $Na_2O$ and $K_2O$ is less than 10% by weight, their effect is very low. When the total amount is more than 19% by weight, the resulting glass has no optical properties as desired. Therefore, the total amount of $Na_2O$ and $K_2O$ is limited to a range of 10–19% by weight, preferably 13–19% by weight.

$P_2O_5$ is a component which is effective for obtaining a glass of high dispersion. When the $P_2O_5$ amount is less than 10% by weight, the resulting glass has no optical properties as desired. When the amount is more than 35% by weight, the resulting glass has a high devitrification tendency and low chemical durability. Therefore, the $P_2O_5$ amount is limited to a range of 10–35% by weight, preferably 10–30% by weight.

$Nb_2O_5$ is a component which is effective for obtaining a glass of high refractive index and high dispersion. When the $Nb_2O_5$ amount is less than 18% by weight, the resulting glass has no optical properties as desired. When the amount is more than 49% by weight, the resulting glass has a high devitrification tendency. Therefore, the $Nb_2O_5$ amount is limited to a range of 18–49% by weight, preferably 22–42% by weight.

$TiO_2$ is a component which is effective for obtaining a glass of high refractive index and high dispersion.

When the $TiO_2$ amount is more than 14% by weight, the resulting glass has a high devitrification tendency. Therefore, the $TiO_2$ amount is limited to a range of 0–14% by weight, preferably 4–14% by weight. $Ta_2O_5$, $ZrO_2$, $WO_3$, PbO, ZnO and $Bi_2O_3$ may be added to replace part of $Nb_2O_5$ or $TiO_2$, whereby the optical constants of the resulting glass can be adjusted. However, when the amounts of $Ta_2O_5$, $ZrO_2$, $WO_3$. PbO, ZnO and $Bi_2O_3$ are more than 20% by weight, 10% by weight, 5% by weight, 20% by weight, 10% by weight and 20% by weight, respectively, the resulting glass has a high devitrification tendency and low dispersion and no desired glass can be obtained. Therefore, the $Ta_2O_5$ amount is limited to a range of 0–20% by weight, preferably 0–15% by weight; the $ZrO_2$ amount to a range of 0–10% by weight, preferably 0–5% by weight; the $WO_3$ amount to a range of 0–5% by weight, preferably 0–3% by weight; the PbO amount to a range of 0–20% by weight, preferably 0–15% by weight; the ZnO amount to a range of 0–10% by weight, preferably 0–5% by weight; and the $Bi_2O_3$ amount to a range of 0–20% by weight, preferably 0–15% by weight. Further, the total amount of $Nb_2O_5$, $Ta_2O_5$, $ZrO_2$, $WO_3$, PbO, ZnO and $Bi_2O_3$ is limited to 18–49% by weight, preferably 22–44% by weight.

$B_2O_3$ is a component which is effective for obtaining a glass of improved meltability and relatively high dispersion. When the $B_2O_3$ amount is more than 15% by weight, the resulting glass has a high devitrification tendency. Therefore, the $B_2O_3$ amount is limited to a range of 0–15% by weight, preferably 3–15% by weight.

$Al_2O_3$ is a component which is effective for obtaining a glass of high dispersion and improved chemical durability. When the $Al_2O_3$ amount is more than 5% by weight, the resulting glass has a high devitrification tendency. Accordingly, the $Al_2O_3$ is limited to a range of 0–5% by weight, preferably 0–3% by weight.

$As_2O_3$ is a component which is effective as an achromatic agent when the $Nb_2O_5$ and $TiO_2$ amount is high. When the $As_2O_3$ amount is more than 3% by weight, the resulting glass has a high devitrification tendency. Therefore, the $As_2O_3$ amount is limited to a range of 0–3% by weight, preferably 0–1% by weight. Incidentally, the $As_2O_3$ amount is determined based on the total weight of all the glass components other than $As_2O_3$.

As is ordinarily done, small amounts of $Sb_2O_3$, F, etc. may also be added for the purposes of achromatization, deaeration, etc.

EXAMPLES

The present invention is described in more detail below by way of Examples.

Total 19 kinds of optical glasses of high refractive index and high dispersion all according to the present invention were produced as follows.

In the optical glasses of Examples 1–19, the following substances were used as raw materials for the components. That is, as the raw material for $P_2O_5$, there was used an aqueous orthophosphoric acid ($H_3PO_4$) solution or a phosphate such as potassium metaphosphate or the like; and as the raw materials for other components, there was used an oxide, a carbonate, a phosphate, a nitrate or the like corresponding to each component. For example, in the optical glass of Example 5 comprising 5.0% by weight of $SiO_2$, 18.0% by weight of $GeO_2$, 5.0% by weight of $Na_2O$, 10.0% by weight of $K_2O$, 17.4% by weight of $P_2O_5$, 29.3% by weight of $Nb_2O_5$, 6.7% by weight of $TiO_2$ and 8.6% by weight of $B_2O_3$ (the total amount of the above components is 100% by weight) and further comprising, as a deaerating agent, 0.2% by weight, based on the above components, of $As_2O_3$, there were used, as raw materials, respective oxides for $SiO_2$, $GeO_2$, $Nb_2O_5$, $TiO_2$ and $As_2O_3$, respective nitrates for $Na_2O$ and $K_2O$, an aqueous orthophosphoric acid ($H_3PO_4$) solution for $P_2O_5$, and boric acid ($H_3BO_3$) for $B_2O_3$. The optical glasses of Examples 1–19 were produced by mixing the above mentioned raw materials in such proportions as to give a composition as shown in Table 1 or 2, melting the mixture in a platinum crucible at 1,200°–1,400° C. followed by deaeration and stirring, casting the melt into a mold, and slowly cooling the melt in the mold.

The thus obtained optical glasses of Examples 1–19 were measured for optical constants (refractive index nd and Abbe's number νd), liquidus temperature LT and devitrification resistance. The results are shown in Tables 1 and 2. The prior art glasses (Comparative Examples A–G) were also measured for the same test items, and the results are shown in Table 3. In Table 3, the glass of Comparative Example A conforms to the glass of Example 357 of above mentioned Japanese Pat. Application Kokai (Laid-Open) No. 17409/1974; the glass of Comparative Example B conforms to the glass of Example 7 of above mentioned Japanese Patent Publication No. 40094/1981; and the glasses of Comparative Examples C, D, E, F and G conforms to the glasses of Examples 1, 3, 8, 9 and 10, respectively, of above mentioned Japanese Patent Publication No. 54247/1985.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Components (wt. %) | | | | | | | | | | | |
| $SiO_2$ | 6.0 | 18.5 | 13.7 | 5.0 | 5.0 | 5.5 | 15.5 | 15.5 | 26.0 | 17.5 | 9.9 |
| $GeO_2$ | | | 15.0 | 5.0 | 18.0 | 18.0 | | | | | |
| $SiO_2 + GeO_2$ | 6.0 | 18.5 | 28.7 | 10.0 | 23.0 | 23.5 | 15.5 | 15.5 | 26.0 | 17.5 | 9.9 |
| $Na_2O$ | 8.0 | 5.0 | 10.0 | 8.0 | 5.0 | 3.0 | | 8.0 | 19.0 | 7.0 | 8.0 |
| $K_2O$ | 10.0 | 12.0 | 9.0 | 10.0 | 10.0 | 10.0 | 18.0 | 10.0 | | 10.0 | 10.0 |
| $Na_2O + K_2O$ | 18.0 | 17.0 | 19.0 | 18.0 | 15.0 | 13.0 | 18.0 | 18.0 | 19.0 | 17.0 | 18.0 |
| $P_2O_5$ | 19.1 | 14.1 | 10.1 | 23.8 | 17.4 | 30.5 | 15.4 | 14.1 | 10.1 | 14.8 | 17.4 |
| $Nb_2O_5$ | 47.5 | 30.3 | 23.3 | 24.8 | 29.3 | 23.3 | 29.5 | 29.5 | 28.3 | 31.3 | 21.9 |
| $TiO_2$ | | 13.2 | 14.0 | 11.7 | 6.7 | 9.7 | 14.0 | 14.0 | 11.7 | 12.2 | 4.2 |
| $Ta_2O_5$ | | | | | | | | | | | 20.0 |
| $ZrO_2$ | | | | | | | | | | | |
| $WO_3$ | | | | | | | | | | | |
| PbO | | | | | | | | | | | |
| ZnO | | | | | | | | | | | |
| $Bi_2O_3$ | | | | | | | | | | | |

TABLE 1-continued

|  | Examples | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| (x) | 47.5 | 30.3 | 23.3 | 24.8 | 29.3 | 23.3 | 29.5 | 29.5 | 28.3 | 31.3 | 41.9 |
| $B_2O_3$ | 9.4 | 6.9 | 4.9 | 11.7 | 8.6 |  | 7.6 | 6.9 | 4.9 | 7.2 | 8.6 |
| $Al_2O_3$ |  |  |  |  |  |  |  | 2.0 |  |  |  |
| $As_2O_3$ | 0.2 | 0.2 | 0.2 | 0.2 | 0.2 | 0.2 | 0.2 | 0.2 | 0.2 | 0.2 | 0.2 |
| nd | 1.74655 | 1.74876 | 1.73902 | 1.71717 | 1.73114 | 1.72015 | 1.75283 | 1.71371 | 1.71585 | 1.75280 | 1.70910 |
| νd | 26.67 | 24.78 | 26.77 | 26.25 | 26.92 | 26.48 | 24.27 | 27.65 | 28.49 | 24.68 | 29.31 |
| LT (°C.) | 905 | 1020 | 960 | 940 | 890 | 980 | 1010 | 910 | 1000 | 1000 | 810 |
| Devitrification resistance | Transparent | Transparent | Transparent | Transparent | Transparent | Transparent | Transparent | Transparent | Transparent | Transparent | Transparent |

Notes
1. (x) is the total amount of $Nb_2O_5$, $Ta_2O_5$, $ZrO_2$, $WO_3$, PbO, ZnO and $Bi_2O_3$.
2. Devitrification resistance was evaluated by heating and softening 20 g of a glass block, cooling the softened block to room temperature, and observing the glass state.

TABLE 2

|  | Examples | | | | | | | |
| --- | --- | --- | --- | --- | --- | --- | --- | --- |
|  | 12 | 13 | 14 | 15 | 16 | 17 | 18 | 19 |
| Components (wt. %) | | | | | | | | |
| $SiO_2$ | 9.9 | 9.9 | 9.9 | 9.9 | 9.9 | 6.5 | 11.5 | 15.5 |
| $GeO_2$ |  |  |  |  |  |  |  |  |
| $SiO_2 + GeO_2$ | 9.9 | 9.9 | 9.9 | 9.9 | 9.9 | 6.5 | 11.5 | 15.5 |
| $Na_2O$ | 8.0 | 8.0 | 8.0 | 8.0 | 8.0 | 5.5 | 7.5 | 8.0 |
| $K_2O$ | 10.0 | 10.0 | 10.0 | 10.0 | 10.0 | 10.0 | 10.0 | 10.0 |
| $Na_2O + K_2O$ | 18.0 | 18.0 | 18.0 | 18.0 | 18.0 | 15.5 | 17.5 | 18.0 |
| $P_2O_5$ | 17.4 | 17.4 | 17.4 | 17.4 | 17.4 | 14.8 | 14.8 | 15.0 |
| $Nb_2O_5$ | 31.9 | 21.9 | 31.9 | 21.9 | 36.9 | 43.8 | 36.8 | 34.0 |
| $TiO_2$ | 4.2 | 4.2 | 4.2 | 4.2 | 4.2 | 12.2 | 12.2 | 10.2 |
| $Ta_2O_5$ |  |  |  |  |  |  |  |  |
| $ZrO_2$ | 10.0 |  |  |  |  |  |  |  |
| $WO_3$ |  |  |  |  | 5.0 |  |  |  |
| PbO |  | 20.0 |  |  |  |  |  |  |
| ZnO |  |  | 10.0 |  |  |  |  |  |
| $Bi_2O_3$ |  |  |  | 20.0 |  |  |  |  |
| (x) | 41.9 | 41.9 | 41.9 | 41.9 | 41.9 | 43.8 | 36.8 | 34.0 |
| $B_2O_3$ | 8.6 | 8.6 | 8.6 | 8.6 | 8.6 | 7.2 | 7.2 | 7.3 |
| $Al_2O_3$ |  |  |  |  |  |  |  |  |
| $As_2O_3$ | 0.2 | 0.2 | 0.2 | 0.2 | 0.2 | 0.2 | 0.2 | 0.2 |
| nd | 1.73132 | 1.71095 | 1.71084 | 1.71922 | 1.73536 | 1.82812 | 1.78835 | 1.74670 |
| νd | 28.39 | 29.19 | 29.39 | 28.08 | 26.57 | 21.90 | 23.37 | 25.51 |
| LT (°C.) | 1020 | 795 | 855 | 835 | 850 | 1020 | 1020 | 950 |
| Devitrification resistance | Transparent | Transparent | Transparent | Transparent | Transparent | Transparent | Transparent | Transparent |

Note
For (x) and devitrification resistance, reference is made to the footnotes of Table 1.

TABLE 3

|  | Comparative Examples | | | | | | |
| --- | --- | --- | --- | --- | --- | --- | --- |
|  | A | B | C | D | E | F | G |
| Components (wt. %) | | | | | | | |
| $P_2O_5$ | 32.3 | 31.3 |  |  |  |  |  |
| $SiO_2$ |  |  | 10.0 | 15.0 | 20.0 | 20.0 | 20.0 |
| $Na_2O$ | 17.7 |  | 25.0 |  |  | 20.0 | 10.0 |
| $K_2O$ |  | 16.2 |  | 27.0 | 25.0 | 5.0 | 10.0 |
| $BPO_4$ |  |  | 22.0 | 10.0 |  | 13.0 | 2.0 |
| $TiO_2$ | 20.0 | 24.8 | 18.0 | 23.0 | 30.0 | 27.0 | 23.0 |
| $Nb_2O_5$ |  | 22.9 | 25.0 | 25.0 | 15.0 | 15.0 | 35.0 |
| $WO_3$ | 30.0 |  |  |  |  |  |  |
| ZnO |  | 4.8 |  |  |  |  |  |
| $Al(PO_3)_3$ |  |  |  |  | 10.0 |  |  |
| $As_2O_3$ |  |  | 0.5 | 0.5 |  | 0.5 | 0.5 |
| nd | 1.8012 | 1.8178 | 1.7322 | 1.7505 | 1.7433 | 1.7385 | 1.8395 |
| νd | 20.8 | 21.8 | 26.5 | 25.5 | 24.9 | 26.2 | 22.5 |
| LT (°C.) | >1050 | >1050 | >1040 | >1050 | >1050 | >1040 | >1050 |
| Devitrification resistance | Devitrified | Devitrified | Devitrified | Devitrified | Devitrified | Devitrified | Devitrified |

Note
For devitrification resistance, reference is made to the footnote (2) of Table 1.

As is clear from Table 1, the glass of Example 5 had a refractive index nd of 1.73114, an Abbe's number νd of 26.92 and a liquidus temperature LT of 890° C. and showed good devitrification resistance, and accordingly was a glass of high refractive index, high dispersion and good stability which had been difficult to obtain in the past. As is also clear from Table 1, the optical glasses of Examples 1–4 and 6–19 as well had a refractive index nd of 1.70 or more and an Abbe's number νd of 30 or less, were free from devitrification and transparent, and showed excellent devitrification resistance. Meanwhile, the glasses of Comparative Examples A–G were all devitrified. In ordinary glasses, when the liquidus temperature LT of a glass is higher, the glass is less stable and is devitrified more easily. Therefore, in Tables 1–3, liquidus temperature LT was shown as a yardstick for devitrification resistance. The optical glasses of Examples 1–19 gave lower liquidus temperatures than the glasses of Comparative Examples A–G, indicating superior devitrification resistance.

As described above, there can be obtained, according to the present invention, an optical glass of high refractive index and high dispersion having a refractive index nd of 1.70 or more and an Abbe's number νd of 30 or less and being excellent in devitrification resistance and stability. Combining this optical glass with an optical glass of low dispersion makes it possible to obtain an achromatic lens having a high aperture ratio. The present invention also enables the mass production of an optical glass of uniformity and free from devitrification, as in the case of production of ordinary optical glasses. Thus, the present invention can be used in production of various optical products and has high practical value.

What is claimed is:

1. An optical glass having a refractive index nd of at least 1.70 and an Abbe's number νd of at most 30 consisting essentially, in percent by weight based upon the total composition, of:

| | |
|---|---|
| $SiO_2$ | 5–30% |
| $GeO_2$ | 0–25% |
| the sum of $SiO_2$ and $GeO_2$ | 5–30% |
| $Na_2O$ | 0–19% |
| $K_2O$ | 0–19% |
| the sum of $Na_2O$ and $K_2O$ | 10–19% |
| $P_2O_5$ | 10–35% |
| $Nb_2O_5$ | 18–49% |
| $TiO_2$ | 0–14% |
| $Ta_2O_5$ | 0–20% |
| $ZrO_2$ | 0–10% |
| $WO_3$ | 0–5% |
| PbO | 0–20% |
| ZnO | 0–10% |
| $Bi_2O_3$ | 0–20% |
| the sum of $Nb_2O_5$, $Ta_2O_5$, $ZrO_2$, $WO_3$, PbO, ZnO and $Bi_2O_3$ | 18–49% |
| $B_2O_3$ | 0–15% |
| $Al_2O_3$ | 0–5% |
| and further comprising | |
| $As_2O_3$ | 0.3% by weight based on the total amount of the above components. |

2. An optical glass according to claim 4, consisting essentially, in percent by weight based on the total composition of:

| | |
|---|---|
| $SiO_2$ | 5–26% |
| $GeO_2$ | 0–18% |
| the sum of $SiO_2$ and $GeO_2$ | 5–26% |
| $Na_2O$ | 5–19% |
| $K_2O$ | 5–18% |
| the sum of $Na_2O$ and $K_2O$ | 13–19% |
| $P_2O_5$ | 10–30% |
| $Nb_2O_5$ | 22–42% |
| $TiO_2O$ | 4–14% |
| $Ta_2O_5$ | 0–15% |
| $ZrO_2$ | 0–5% |
| $WO_3$ | 0–3% |
| PbO | 0–15% |
| ZnO | 0–5% |
| $Bi_2O_3$ | 0–15% |
| the sum of $Nb_2O_5$, $Ta_2O_5$, $ZrO_2$, $WO_3$, PbO, ZnO and $Bi_2O_3$ | 22–44% |
| $B_2O_3$ | 3–15% |
| $Al_2O_3$ | 0–3% |
| and further comprising | |
| $As_2O_3$ | 0–1% by weight based on the total amount of the above components. |

3. An optical glass according to claim 1, further containing a chromatizing or deaerating amount of $Sb_2O_3$, F or both.

* * * * *